United States Patent [19]
Caiola

[11] 3,801,783
[45] Apr. 2, 1974

[54] APPARATUS FOR SCREENING CYTOLOGICAL SPECIMENS

[75] Inventor: Leonard Caiola, Ridgewood, N.J.

[73] Assignee: Information Utilization Corporation, New York, N.Y.

[22] Filed: July 22, 1971

[21] Appl. No.: 165,117

Related U.S. Application Data

[62] Division of Ser. No. 836,768, June 26, 1969, Pat. No. 3,678,148.

[52] U.S. Cl.................. 250/303, 250/304, 424/1
[51] Int. Cl. .......................................... G21h 5/02
[58] Field of Search........ 250/71 T, 71 G, 83.3 UV, 250/106 SC, 43.5 MR, 83 SA, 303, 304; 424/1

[56] References Cited
UNITED STATES PATENTS

| | | | |
|---|---|---|---|
| 3,673,410 | 6/1972 | Waite et al..................... | 250/71 T X |
| 3,246,149 | 4/1966 | Kazenas et al. .................... | 250/71 T |
| 3,451,777 | 6/1969 | Di Giulio ........................ | 250/83 SA |
| 3,497,690 | 2/1970 | Wheeless, Jr. et al.. | 250/83.3 UV X |
| 3,574,064 | 4/1971 | Binnings et al. .......... | 250/106 SC X |

OTHER PUBLICATIONS

Protein Synthesis and RNA Synthesis During Mitosis in Animal Cells, by Konrad, C. G., from Journal of Cell Biology, Vol. 19, 1963, pgs. 267–277.

*Primary Examiner*—Archie R. Borchelt
*Attorney, Agent, or Firm*—Gottlieb, Rackman & Reisman

[57] ABSTRACT

A slide specimen of exfoliated cells is prepared in the usual manner for microscopic optical examination of a Papanicloaou Test, up to the point of staining. At this stage, instead of the ordinary stains, a stain containing a radioisotope is used. The slide with the radioisotope-bearing stain is thereupon passed through a radiation counter which gives an indication of the amount of radiation the slide emits, which indicates the amount of radioactive stain absorbed by the specimen. This relative absorption amount indicates the differential staining of the cellular material and forms the equivalent electronic differentiation of the specimens to the standard Papanicolaou optical differentiation as viewed through the microscope. In this way, the automatic radiation counter is used to substitute for the human element in the microscopic evaluation of the specimens.

9 Claims, 2 Drawing Figures

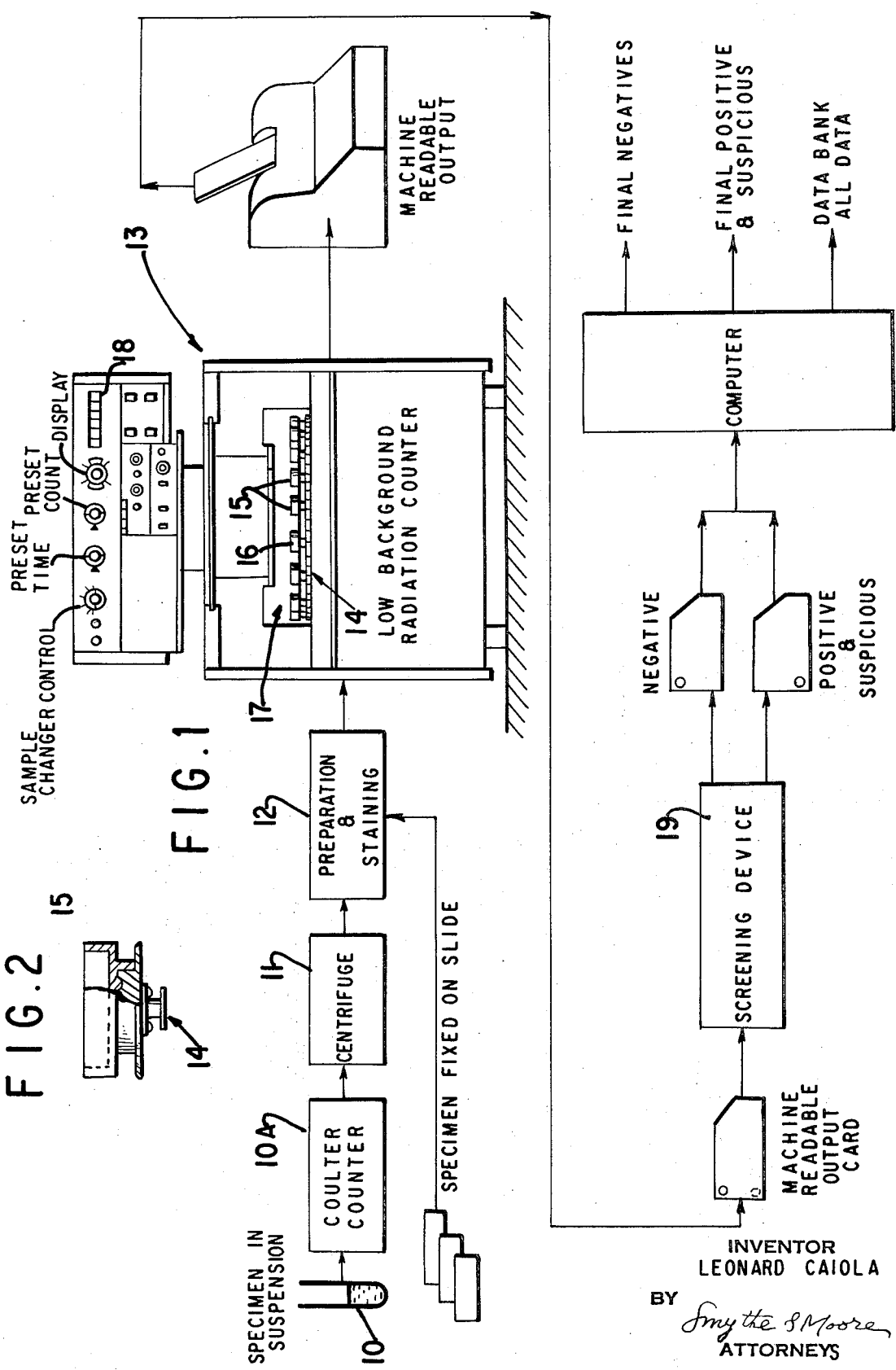

APPARATUS FOR SCREENING CYTOLOGICAL SPECIMENS

This application is a division of U.S. Pat. application Ser. No. 836,768, filed June 26, 1969, now U.S. Pat. No. 3,678,148.

The present invention relates to the examination of cellular specimens by means of an automatic electronic device instead of manually by a microscope.

The Papanicolaou Test is well established as a universal medical method for the diagnosis of cancer from all mucous cavities of the human body, such as cervical and vaginal cancer in women, and in lung, stomach, and rectal examinations in both sexes. This test is particularly notable in medicine for its ability to indicate cancer in its earliest stages when it is most subject to treatment and cure.

For this reason, the Pap Test (as the Papanicolaou Test is known) is invaluable as a routine check against the presence of cancer. However, since the test is now carried out by trained cyto-technicians seated at microscopes, it therefore involves a certain extended amount of time for the scanning of slides. On the average, the minimum time required, as determined by the statistics of the majority of cytological laboratories, is fifteen minutes. However, since a degree of human subjective judgement is involved in such a reading, the number of slides a single cyto-technician can read is sharply reduced by eye-strain, brain fatigue, and other subjective obstacles to sustained microscopic examination. None of these obstacles apply to an electronic radiation detection mechanism, so that the use of such devices decidedly increases the number of slides that can be scanned by automatic machinery. The importance of this phase of the Pap Test is that it is highly desirable to make this a routine test of all adults, and so the problem of a population ratio against the number of cyto-technicians available for such testing is of crucial significance to the medical world.

One of the objects of the present invention is to provide an electromechanical method of evaluating and analyzing slides.

Another object is to conduct such evaluation and analysis in a minimum of time with maximum accuracy.

Another of the objects of the invention is to provide a process for the analysis of slide specimens for the Pap Test.

According to one aspect of the invention, a test sample of specimen is furnished in the form of exfoliated cellular material either as a cell suspension or slide deposition. When furnished in suspension, it is counted for cell population by a Coulter/Counter and is then centrifuged, and the concentrated cell deposit is then spread out or placed upon a glass slide or slides in equal amounts. The selective biological stain containing a radioactive element is applied to the slide. The slide is then fixed, and then conveyed upon a continuous belt to a radioactive responsive apparatus which is a radiation counter. The counter then registers in numerical form the amount of radiation emitted by each slide. The differential rate of absorption by the cells is the criterion which directs the cyto-technician in his optical examination for the presence of suspicious or positive cancer indications.

The slides are classified according to their radioactive levels such that the slides whose levels fall below a certain number are classified as negative, those above that range, but below a higher number, are classified as suspicious, and those at or above a higher level are classified as positive. All slides classified suspicious or positive are then referred to a cyto-technician for careful review by the microscope method, and then can be passed on to a Pathologist for confirmation. In every case the readings of the radiation counter from all slides are filled in the storage units of a computer which will store the data and make complete correlation of all of the findings.

Other objects, advantages and features of the present invention will be apparent from the accompanying description and drawings, which are merely exemplary.

In the drawings:

FIG. 1 is a schematic diagram; and

FIG. 2 is an elevational view in an enlarged scale and partially in section of one form of holder in the low background radiation counter.

In carrying out the process according to the present invention, the slide specimen for the Pap Test is prepared in a previously known manner. Each test sample or specimen is received in the form of exfoliated cellular material either as a cell suspension or slide deposition. When furnished in suspension as indicated at 10 in a manner known in the art, it is counted for cell population by a Coulter/Counter 10A, as manufactured by Coulter Electronics, Inc., Hialeah, Florida, and can then be automatically conveyed to a centrifuge 11, centrifuged, with the residue in the form of a cell layer collection being automatically deposited onto a microscope slide or slides. The centrifuge may be a multi-place cyto-centrifuge such as manufactured by the Shandon Scientific Co. Ltd., 65 Pound Lane, Willesden, London, Great Britain. The slide specimen is then automatically stained at a work station 12 with a biological stain containing a radioactive material which has the property of attaching to the cells of the specimen. The cells are thus tagged with a radioactive material. One such stain which could be used is known as "methylene blue" which has had $C_{14}$ added thereto. Others which can be used are $C_{14}$ tagged "Orange G" and $C_{14}$ tagged Eosin. Another example of a stain is hematoxylin tagged with a suitable radioactive material. Other such radioisotopes including tritium (H–3) may be used.

Work station 12 may comprise a Shandon-Elliott automatic slide staining machine such as manufacuted by said Shandon Scientific Co. Ltd., of Willesden, London, Great Britain. The use of automatic slide staining apparatus speeds up the testing procedure and releases skilled technicians from complicated manual slide staining processes.

The staining of slide specimens prior to examination is known in the bio-medical field. However, staining the slide specimen for a Pap Test, so that the cells are tagged with a radioactive material, significantly facilitates carrying out the analysis of the slide specimen in a manner to be presently described.

The stained specimens are then automatically conveyed to a counter such as one sold under the mark "Omni/Guard 100," a trademark of Tracerlab. The Instrument Division of ICN, Inc., of Oakland, California. The radiation counter is indicated at 13. It preferably is a low background gas flow Geiger or proportional counter instrument, or may also be a liquid scintillation counter or other radiation measuring device. Merely by way of example, such an instrument can have the following characteristics:
1. Counts Alpha and Beta Radiation
2. Window Thickness <150 micrograms/cm$^2$
3. Absolute $C_{14}$ eff. — 35 percent
4. Beta Background <0.5 cpm (1 inch), <1 cpm (2 inches)

The Omni/Guard 100 has an inner detector with an ultra-thin window gas flow counter with maximum beta efficiency of 48 percent. The surrounding detector is a dome-shaped gas flow counter with a maximum cosmic ray efficiency, serving as the guard counter. The plastic material of the guard counter also serves to shield the inner sample counter from radiation emitted from the surrounding materials. It includes an ultra-thin window [<150 micrograms/cm$^2$]. Because of the very thin window, high intrinsic efficiency and excellent geometry, superb system efficiency can be achieved.

The instrument may include a horizontal chain conveyor 14 having a number of specimen holders or bases 15 thereon upon which a specimen 16 can be placed and carried. The sample conveyor positions each sample relative to a sample changer mechanism located within the housing at 17. It is to be understood that other types of counters or detectors and conveying means can be used.

In order to provide a uniform basis for the comparison of sample, each sample is retained in the counting position for a uniform period of time, for example, 12 seconds of exposure. During this time, the radioactive count of the sample is sensed by the counter and may be indicated on a read-out panel 18. The count supplied by the counter will be a quantitative indication of the radioactive uptake of the cells in the specimen so as to measure the results of the test.

A predetermined radioactive level may be established so that samples having a count above this level may be designated as "positive" and so subject to manual optical examination, and samples having a count below this level designated as "negative" and so spared further examination. Specimens having a count in the region closely adjacent to this level both above and below the level may be designated as "suspicious" and thus be also subjected to further examination.

The results of the tests of the samples may also be recorded in punch-card form or programmed so as to constitute an input for a computer such as a digital computer.

The slide specimens themselves are initially retained at counter unit 13, while data cards corresponding to the specimens are then conveyed to a screening or sorting device at 19 which separates the cards representing the definitely negative specimens from those representing the positive and suspicious specimens. The positive and suspicious specimens can then be selected for individual examination by skilled technicians who are trained to interpret the results of the Pap Test.

The slides in all three categories may be stored for subsequent examination with the suspicious and positive slides being tagged for reminder so that the persons from whom these specimens were obtained can be advised of the results and precautionary procedures taken.

By recording to the results of millions of tests on such specimens in the memory unit of a digital computer, the results can be examined and correlated so as to assertain patterns or trends. Further, technicians will be able to prognosticate the possibility of cancer occurring in persons whose tests have been of a particular count. These persons can be advised that at the present time there is no presence of cancer but that the tests indicate a predisposition or likelihood of cancer occurring in the future. Thus, such persons can be carefully watched and subjected to more frequent testing.

The entire apparatus as described above is automatic in nature so that the specimens are conveyed automatically between stations on a predetermined time cycle basis. The testing apparatus may be set up in many different locations but the results of all of these tests can be transmitted to a central computer from which the results of the tests may be read out as desired.

The present records available to the medical profession of Pap Tests have a rather low order of reliability since the data is subjective in nature. The data has depended upon the interpretation of different specimens by a number of different individuals having varying degrees of skill and differing quantities of experience in such analysis work. Different individuals might well disagree on whether or not a particular slide specimen is positive or negative. The present invention provides an objective process of analyzing slide specimens by generating a signal based on the uptake of a cell. The signal is produced by the radioactive material contained in the stain. It is, of course known that the radioactive atom of and by itself is not necessarily the substance that attaches to the unhealthy cells and the radioactive material is a constituent of or attached to the stain. Thus, in effect, the unhealthy cells are tagged with radioactivity.

Merely by way of example, in Table I is shown a printout of test results on four samples. Each sample was exposed to a 12 second count after having been stained for 15 seconds with $C_{14}$ Methylene Blue.

TABLE I

| Column 1 | Column 2 | Column 3 |
|----------|----------|----------|
| 000002   | 000037   | 000020   |
| 000003   | 000130   | 000020   |
| 000004   | 000125   | 000020   |
| 000005   | 000002   | 000020   |

Column 1 indicates sample number from 1 to 100.

Column 2 indicates the actual electronic count based on the uptake of the radioactive stain by the cellular tissues on the slide.

Column 3 shows the time of count and is read in tenths of a minute. Thus, the above counts were taken in two tenths of a minute or 12 seconds.

The diagnosis of these samples is as follows:
2 Inflammatory (non-cancer)
3 Cancer
4 Cancer
5 Negative Those skilled in the art will appreciate that different techniques of specimen preparation and handling can be utilized under this invention. For example, cell specimens may be maintained in suspension throughout the counting, staining and radioactivity measuring steps, with a liquid scintillation counter being suitable for making the radioactivity measurements under such conditions.

It should be apparent that variation may be made in the details of the process and apparatus without departing from the spirit of the invention.

What is claimed is:

1. In an apparatus for analyzing specimens for the Pap Test using exfoliated or tissue biopsy cells, the combination of means for preparing a specimen and for applying a biological stain containing a radioactive material to the specimen, means for ascertaining the radioactive level of a specimen as a quantitative indication of the uptake of the cells therein of radioactive material, and means for sorting the specimens according to the radioactive levels thereof.

2. In an apparatus as claimed in claim 1 wherein there is a centrifuge means for acting upon specimens in solution so that a residue is obtained therefrom which residue is fed to the means for preparing the specimen.

3. In an apparatus as claimed in claim 1 and means for recording the results of the radioactive levels of specimens.

4. In an apparatus as claimed in claim 1 wherein there is a cell counter.

5. In an apparatus as claimed in claim 3 wherein said recording means comprises a digital computer.

6. In an apparatus as claimed in claim 5, wherein the ascertaining means includes means for generating an output signal corresponding to the radioactive level of each of said specimens, and further comprising an output readout unit connected to said computer for receiving said output signal and for furnishing data to said computer.

7. In an apparatus as claimed in claim 2 and conveyor means for transferring said specimens between said centrifuge, preparing and staining means and ascertaining means, and including means for delivering data corresponding to the radioactive levels of each of said specimens to said sorting means.

8. In an apparatus as claimed in claim 6 with said counter having a conveyor upon which said specimens are positioned.

9. In an apparatus as claimed in claim 6 with said means for ascertaining the radioactive level having a conveyor for moving specimens therethrough, a holder for each specimen, and means on said conveyor for retaining said specimen holders thereon.

* * * * *